United States Patent [19]
Nojikawa

[11] Patent Number: 5,868,536
[45] Date of Patent: *Feb. 9, 1999

[54] MALE SCREW AND METHOD FOR MANUFACTURING SAME

[76] Inventor: Terufumi Nojikawa, 4700-5, Ohza-mizuko, Fujimi-shi, Saitama-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 725,989

[22] Filed: Oct. 4, 1996

[51] Int. Cl.$^6$ ...................................................... F16B 39/30
[52] U.S. Cl. ........................... 411/310; 411/308; 411/311; 411/938
[58] Field of Search .................................... 411/308, 309, 411/310, 311, 938

[56] References Cited

U.S. PATENT DOCUMENTS

| | | | |
|---|---|---|---|
| 3,186,464 | 6/1965 | Baumle | 411/938 |
| 3,452,375 | 7/1969 | Gabbey | 411/938 |
| 3,643,722 | 2/1972 | Oestereicher | 411/938 |
| 3,661,194 | 5/1972 | Macfalane et al. | 411/938 |
| 5,385,439 | 1/1995 | Hurdle | 411/311 |

Primary Examiner—Brian K. Green
Assistant Examiner—Robert G. Santos
Attorney, Agent, or Firm—Birch, Stewart, Kolasch & Birch, LLP

[57] ABSTRACT

A male screw which has a protrusion protruding from a thread thereof at least with regard to the normal direction to a flank of the thread. To obtain such male screw, a blank is introduced between rolling dies which are moved relative to one another and is rolled between the rolling dies to be formed with a thread. In this thread rolling process, the rolling pressure on an area of a die face of at least one of the rolling dies is determined to be higher than that in ordinary thread rolling process and the rear end portion of the area of the die face is made to bite into the blank, causing the corresponding portion of the blank to be forced out to form the protrusion.

6 Claims, 10 Drawing Sheets

MALE SCREW AND METHOD FOR MANUFACTURING SAME

BACKGROUND OF THE INVENTION

1. Field of the Invention

This invention relates to a male screw and more particularly to a male screw that can prevent loosening thereof and a method for manufacturing such male screw.

2. Prior art

As a method for preventing a screw from coming loose, the "double nut" structure, wherein two nuts are screwed onto a bolt in contact with each other, has been well known. In this "double nut" structure, strong forces pushing each nut are caused between the nuts to act as a tensile force on the bolt via the threads of the nuts and the bolt, and thereby the threads of the nuts and the thread of the bolt are pressed against each other to prevent the nuts and the bolt from coming loose.

The "double nut" structure, however, cannot be applied to a screw which forms its own internal thread in a object to be screwed in, such as a self tapping screw, wood screw or the like, since it is a method for preventing the loosening of a screw at the side of the nuts. Also, it poses a problem that it costs much labor since two nuts should be screwed on a bolt.

Besides the "double nut" structure, there have been known many methods for preventing a screw from coming loose, but most of them prevent loosening of a screw by using an extra component such as a special washer or the like or by applying adhesive to the screw. Such methods, however, have a disadvantage that the operation of mounting the extra component on the screw or applying adhesive to the screw costs much labor, decreases operating efficiency and increases operation cost.

SUMMARY OF THE INVENTION

It is a principal object of the present invention to provide a male screw that can prevent loosening thereof by itself without any need for an extra component or adhesive.

It is another object of the present invention to provide a male screw that does not cost much labor for preventing loosening thereof.

It is yet another object of the present invention to provide a method for manufacturing such male screw.

It is still another object of the present invention to provide a method for manufacturing such male screw at a low cost.

The male screw of the present invention, which can be applied to a self tapping screw, bolt, machine screw, set screw, wood screw, cap screw or the like, has a protrusion at an appropriate portion of a thread thereof, which protrusion protrudes from the thread at least with regard to the normal direction to a flank of the thread.

When the male screw of the present invention is driven into an object to be screwed in, forming an internal thread in the object (in the event that the male screw is used as a self tapping screw or a wood screw), or screwed into an female screw, and a portion of the thread of the male screw where the protrusion is formed is also screwed into the object or the female screw, the thread of male screw is pressed against the thread of the object or the female screw owing to the protrusion and thereby loosening of the screw is prevented.

Thus the male screw of the present invention can prevent the loosening thereof without an extra nut, an extra component or adhesive, and thereby without costing much labor.

Moreover, unlike the "double nut" structure, the male screw of the present invention can be applied to a self tapping screw and wood screw.

According to the method for manufacturing a male screw of the present invention, the male screw is formed by thread rolling. That is, a blank is introduced between rolling dies which are moved relative to one another and is rolled between the rolling dies to be formed with a thread. In this thread rolling process, the rolling pressure on an area of a die face of at least one of the rolling dies is determined to be higher than that in ordinary thread rolling process and the rear end portion of the area is made to bite into the blank, causing the corresponding portion of the blank to be forced out to form the protrusion.

Thus, the male screw with the protrusion can be manufactured by thread rolling in the same way as an ordinary screw, and thereby the male screw can be manufactured at low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will become more apparent in the light of the following detailed description when taken in connection with the accompanying drawing. It is to be understood that the drawing is designed for the purpose of illustration only and are not intended as defining the limits of the invention.

DETAILED DESCRIPTION OF THE INVENTION

Figure 1:
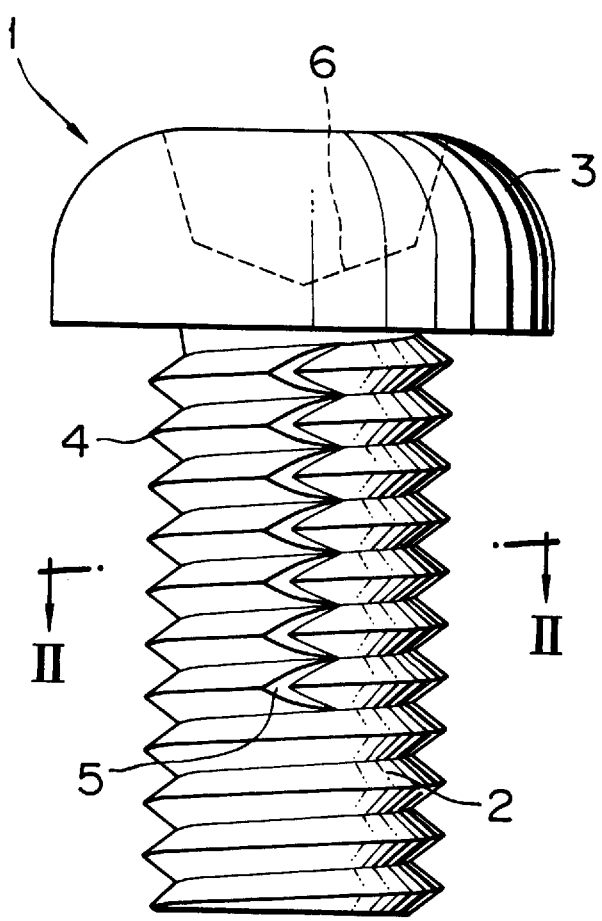
FIG. 1 is a front elevation view of one embodiment of the male screw of the present invention.

The present invention will hereunder be described in conjunction with preferred embodiments of the invention which are shown in the drawings.

Figure 2:
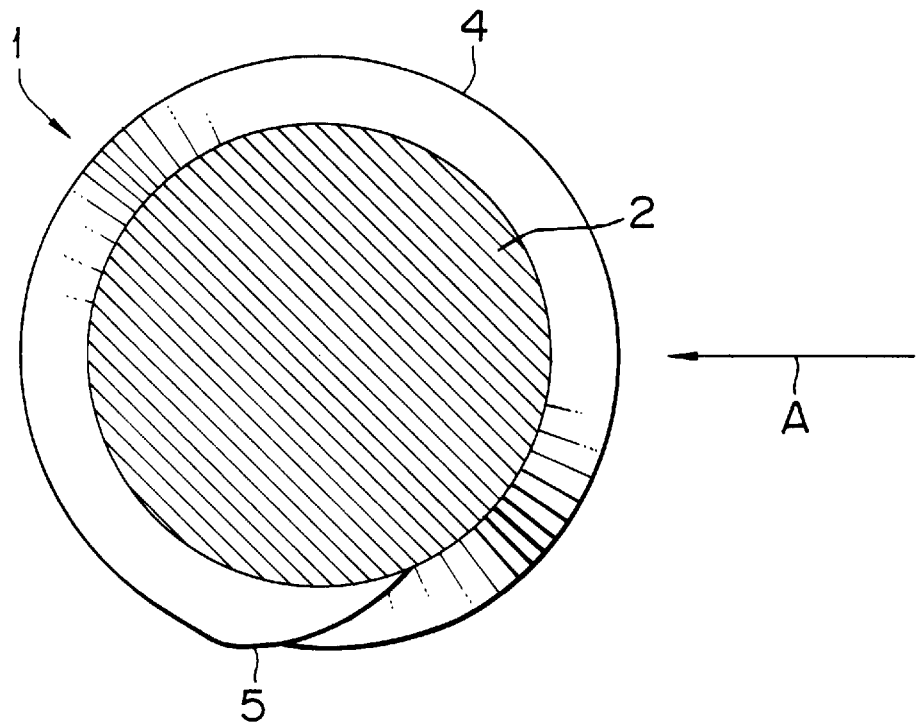
FIG. 2 is an enlarged sectional view of the male screw of FIG. 1 taken along the line II—II of FIG. 1.
Figure 3:
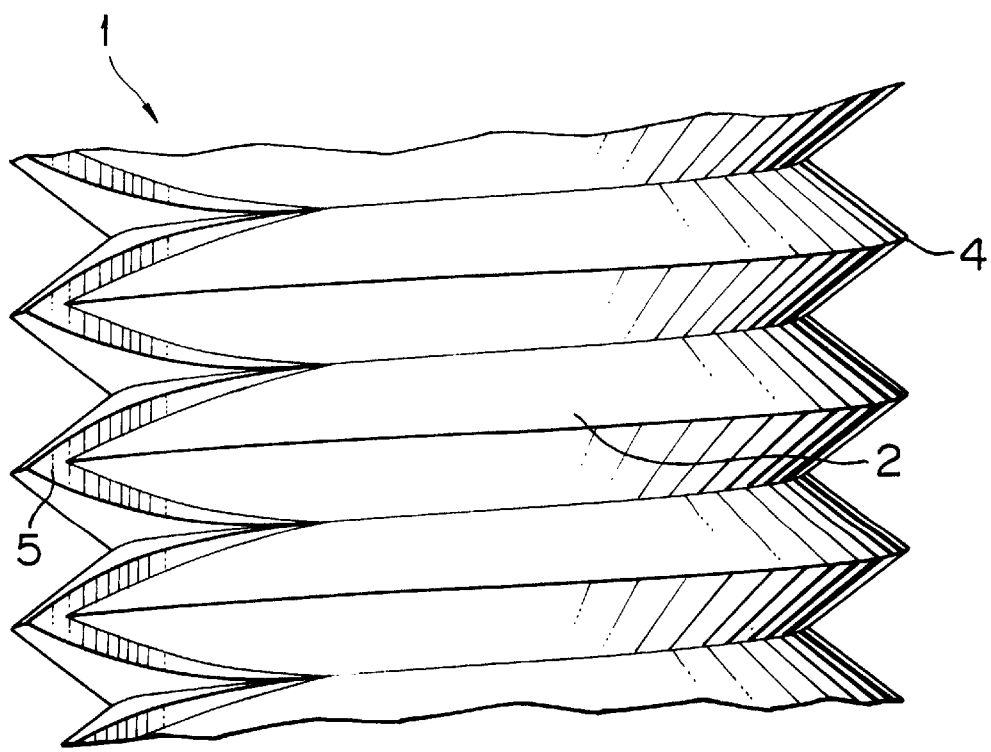
FIG. 3 is a side elevation view of the male screw of FIG. 1 as seen in the direction of arrow A of FIG. 2.

FIG. 1 shows a front elevation view of one embodiment of the male screw of the present invention. The male screw 1 has a shaft 2 formed with a single-start thread 4 and a head 3 formed on one end of the shaft 2. Though in this embodiment the male screw 1 is a single-start thread screw, the present invention can be applied to a multiple-start thread screw. On the rear end side of the shaft 2, the thread 4 is provided with protrusions 5, at every pitch thereof, which protrude from thread 4 in both the normal directions to the flanks of the thread 4 and the radial direction of the shaft 2. FIGS. 2 and 3 are drawings as seen in directions different from FIG. 1 in order to make the shape of the protrusions 5 clearer. FIG. 2 is an enlarged sectional view of the male screw 1 taken along the line II—II of FIG. 1 and FIG. 3 is a side elevation view of the male screw 1 as seen in the direction of arrow A of FIG. 2. In the neighborhood of the forward end of the shaft 2, the thread 4 is not provided with the protrusions 5. The head 3 is provided with a slot or socket 6 in which a screwdriver (not particularly shown) is to be fit in to turn the screw 1.

When the male screw 1 is driven into an object to be screwed in (not particularly shown), forming an internal thread in the object (in the event that the male screw 1 is used as a self tapping screw or a wood screw) or screwed into a female screw, and the portion of the thread 4 where the protrusions 5 are formed is also driven into the object or screwed into the female screw (not particularly shown), the thread 4 is pressed against the thread of the object or the female screw owing to the protrusions 5 and thereby loosening of the screw 1 is prevented.

Figure 4:
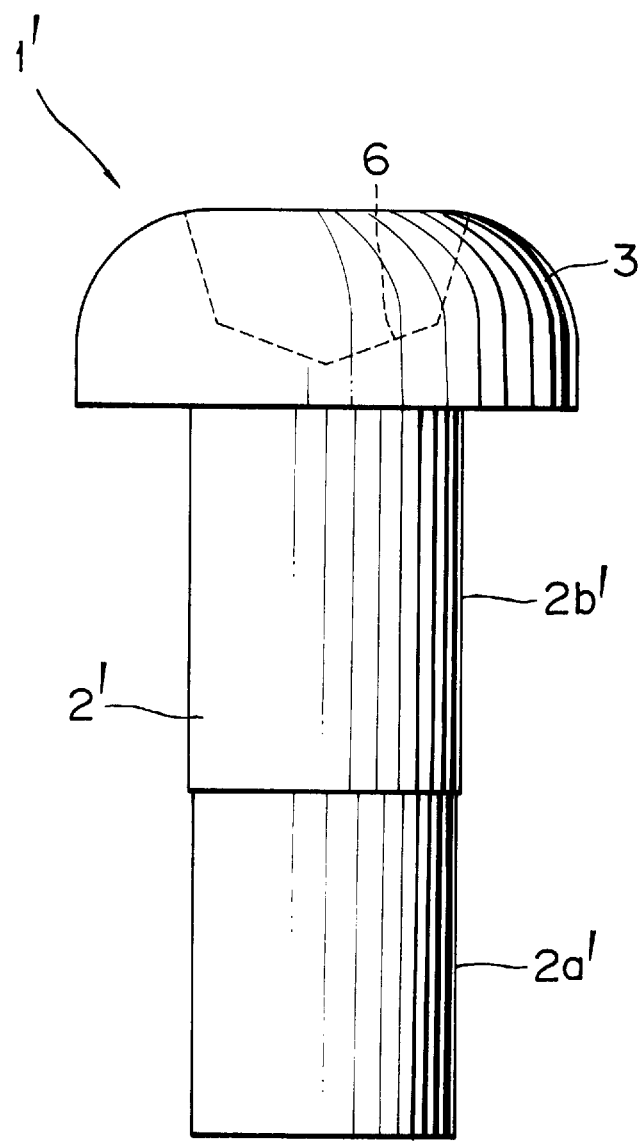
FIG. 4 is a front elevation view of a blank in one embodiment of the method for manufacturing a male screw of the present invention.

An embodiment of a method for manufacturing the male screw 1 shown in FIGS. 1 through 3 will now be described with reference to FIGS. 4 through 9. FIG. 4 shows a blank 1' that is to be formed into the male screw 1 of FIGS. 1 through 3. The blank 1' is provided with a shaft 2' and a head 3. The neighborhood of the forward end of the shaft 2' which will be not provided with the protrusions 5 later is formed as a small-diameter portion 2a', while the rear end side of the shaft 2' that will be provided with the protrusions 5 later is formed as a large diameter portion 2b'. Both the small-diameter portion 2a' and the great-diameter portion 2b' have a round cross section and the diameter of the former is smaller than that of the latter. The head 3 is provided with a slot or socket 6.

Figure 5:
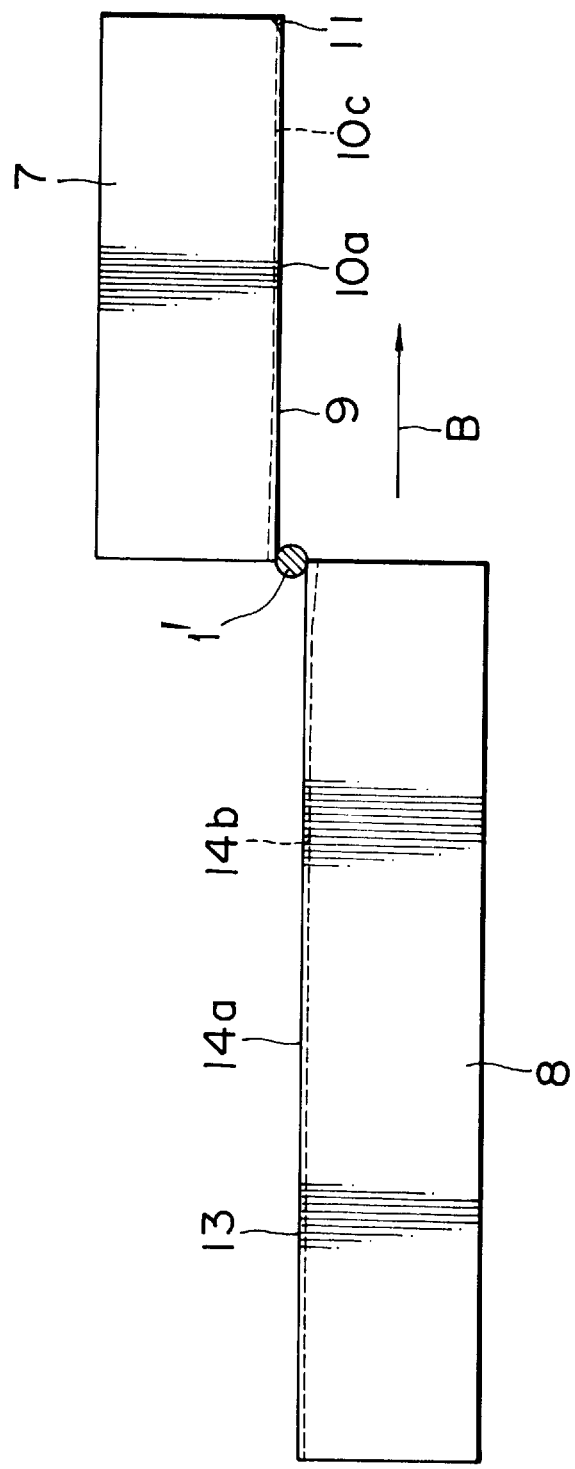
FIG. 5 is a plan view of an apparatus in the embodiment of the method of the present invention, showing a rolling process to form the blank of FIG. 4 into the male screw of FIG. 1.
Figure 6:
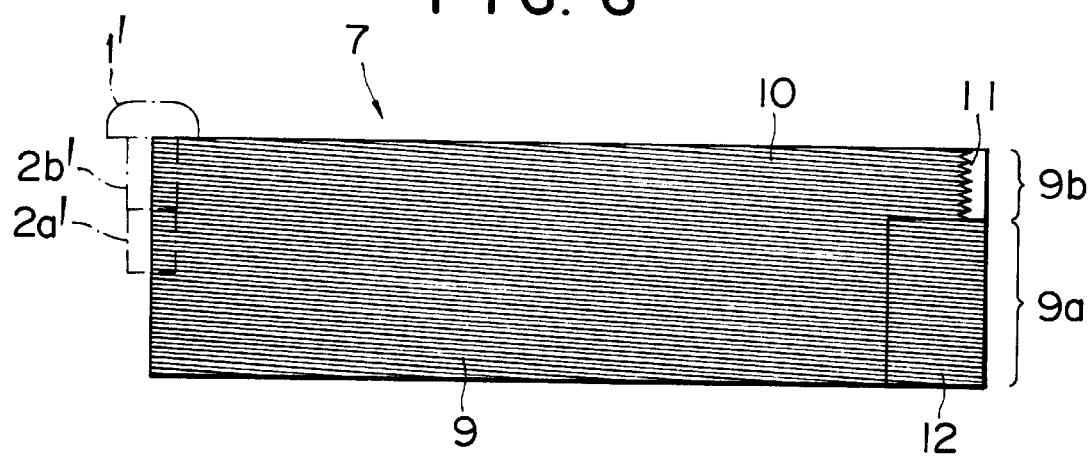
FIG. 6 is a front elevation view of a fixed die that constitutes the apparatus of FIG. 5.
Figure 7:
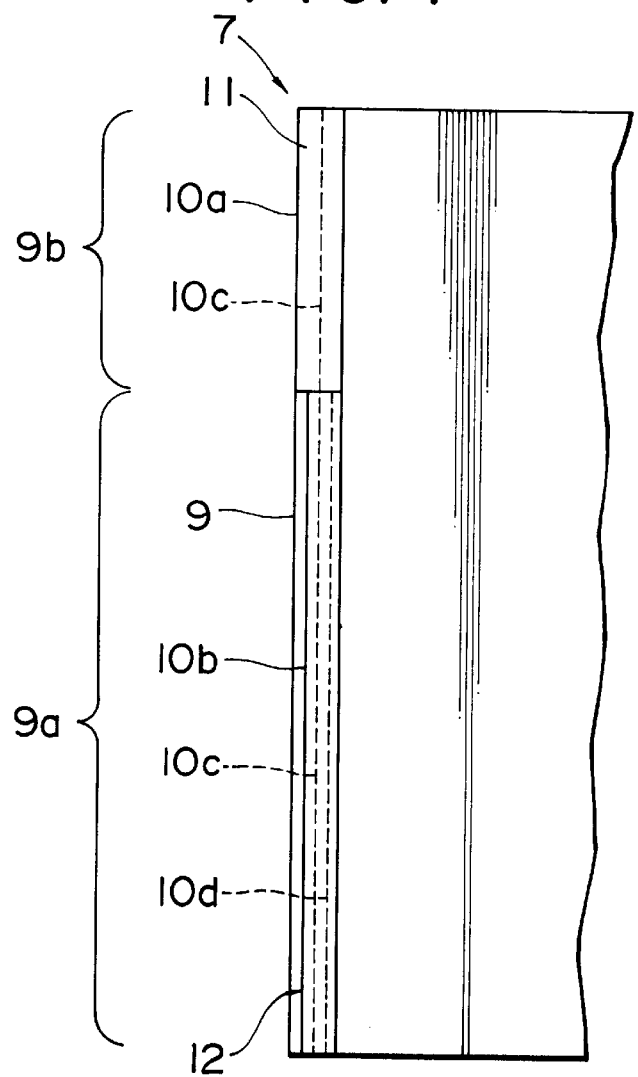
FIG. 7 is an enlarged side elevation view of the fixed die of FIG. 6.
Figure 8:
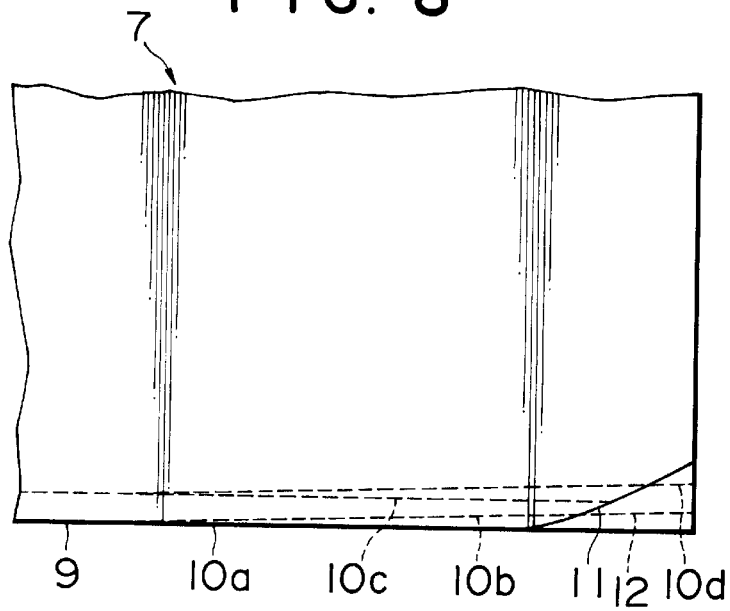
FIG. 8 is an enlarged plan view of the fixed die of FIG. 6.
Figure 9:
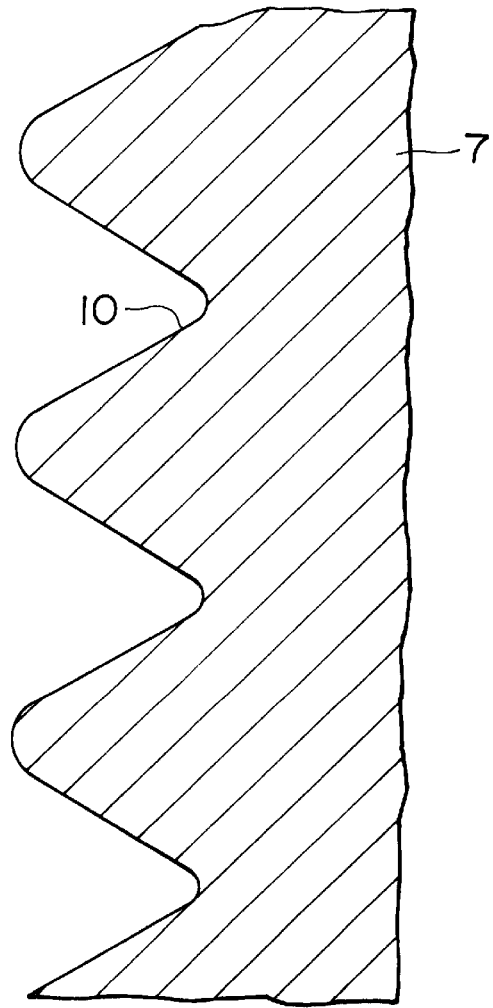
FIG. 9 is an enlarged cross sectional view of a thread forming groove formed on the fixed die of FIG. 6.

FIG. 5 is a plan view of an apparatus in this embodiment of the method for the present invention, showing a rolling process to form the blank of FIG. 4 into the male screw of FIG. 1 through 3. The apparatus comprises a flat rolling fixed die 7 and a flat rolling moving die 8. FIG. 6 is a front elevation view of the fixed die 7, FIG. 7 is an enlarged side elevation view of the fixed die 7 and FIG. 8 is an enlarged plan view of the fixed die 7. A die face 9 of the fixed die 7 is provided with thread forming grooves 10 each of which has a cross section corresponding to the cross section of the thread 4 of the male screw 1, as shown in FIG. 9. In FIGS. 5, 7 and 8 the top face of the die face 9 has a run off 12 that will be described in detail later and is represented by a line 10b in the run off 12, shown as a continuous line in FIG. 7 and as a broken line in FIG. 8. The top face of the die face 9 in the area other than the run off 12 is represented by a continuous line 10a. The bottoms of the thread forming grooves 10 in the run off 12 are represented by a broken line 10d, and the bottoms of the thread forming grooves 10 in the area other than the run off 12 are represented by a broken line 10c. As shown in FIGS. 5 and 8, a slope 11 which slants to go away from the moving die 8 is formed on the rearward end of an area 9b of the die face 9 of the fixed die 7, which area 9b is seen in the upper area of the die face 9 in FIG. 6 and will come into contact with the great-diameter portion 2b' of the blank 1'. Though in this embodiment the slope 11 is arcuately curved, the slope 11 may be a slanted plane surface.

On the other hand, the run off 12 which is of the same kind as that of an ordinary flat rolling die is formed on an area 9a of the die face 9 of the fixed die 7, which area 9a is seen in the lower area of the die face 9 in FIG. 6 and will come into contact with the small-diameter portion 2a' of the blank 1'. In the run off 12, as best shown in FIG. 8, the top face 10b of the die face 9 and the bottoms 10d of the thread forming grooves 10 are slanted to gradually go away from the moving die 8. The inclination of the run off 12 is smaller than that of the slope 11. Though in this embodiment, unlike the bottoms 10d of the thread grooves 10 in the run off 12, the bottoms 10c of the thread grooves 10 in the slope 11 are not slanted, they may be slanted to go away from the moving die 8 in the same manner as the bottoms 10d of the thread grooves 10 in the run off 12.

As shown in FIG. 5, the moving die 8 has substantially the same structure as that of an ordinary flat moving rolling die, and no slope nor run off such as those of the fixed die 7 is formed on a die face 13 of the moving die 8. In FIG. 5, 14a denotes the top face of the die face 13 and 14b denotes the bottoms of the thread forming grooves of the moving die 8.

The moving die 8 is moved straight in the direction of the arrow B in FIG. 5, the blank 1' is introduced between the fixed die 7 and the moving die 8 so that the great-diameter portion 2b' of the shaft 2' of the blank 1' may keep in contact with the area 9b of the die face 9 of the fixed die 7 and the small-diameter portion 2a' of the shaft 2' may keep in contact with the area 9a of the die face 9 of the fixed die 7, and the blank 1' is rolled between the fixed die 7 and the moving die 8, causing the thread 4 to be progressively formed on the shaft 2' of the blank 1.

The rolling pressure at the contact portion between the small-diameter portion 2a' and the area 9a' of the die face 9 of the fixed die 7 is determined to be the same as that in ordinary thread rolling process, while the rolling pressure at the contact portion between the great-diameter portion 2b' of the blank 1' and the area 9b of the die face 9 is generally greater than that in ordinary thread rolling process because the great-diameter portion 2b' is greater than the small-diameter portion 2a' in diameter. Conversely speaking, the diameter of the great-diameter portion 2b' of the blank 1' is determined so that the rolling pressure at the contact portion between the great-diameter portion 2b' and the area 9b of the fixed die 7 may be greater than the ordinary rolling pressure by an appropriate magnitude.

When the blank 1' reaches the beginning of the slope 11 which is situated in the rearward end of the area 9b of the die face 9 of the fixed die 7, the beginning of the slope 11 deeply bites into the greater-diameter portion 2b' of the blank 1' and the corresponding portion of the blank 1' is forced out to form the protrusions 5 which protrude from the thread 4 in both the normal direction to the flanks of the thread 4 and the radial direction of the shaft 2, since at the beginning of the slope 11 the contact area between the fixed die 7 and the blank 1' becomes small and thereby the contact pressure becomes high.

On the other hand, in the area 9a the protrusions 5 are not formed and the thread 4 is formed in the same way as an ordinary thread, because, the rolling pressure is an ordinary value and the inclination of the run off 12 is so small that the run off 12 gradually goes away from the moving die 8.

Though the shaft 2 of the male screw 1 of FIG. 1 is not formed with protrusions 5 in the neighborhood of the forward end thereof but is only in the remaining or rear part thereof, the shaft 2 may be formed with the protrusions 5 over all the length thereof. Such configuration can be obtained by determining the rolling pressure to be greater than an ordinary value for the overall length of the blank 1' and by forming the slope 11 at the rearward end of the whole area of the die face 9 of the fixed die 7 with which the blank 1' will come into contact. In the event that the shaft 2 is formed with the protrusions 5 over all the length thereof, however, it may be very tightly screwed into an object to be screwed in or a female screw from the very beginning of the screw-in, and thereby the screw-in operation may not be performed smoothly. On the other hand, in the event that the shaft 2 is provided with the protrusions 5 in the part other than the neighborhood of the forward end thereof as in FIG. 1, it will be smoothly screwed into an object to be screwed in or a female screw until the protrusions 5 are screwed into the object or the female screw and thereafter the function of preventing loosening of the screw can be obtained. This is a great advantage because usually the function of preventing loosening of the screw is necessary only after the screw is tightened up to the some extent.

Figure 10:
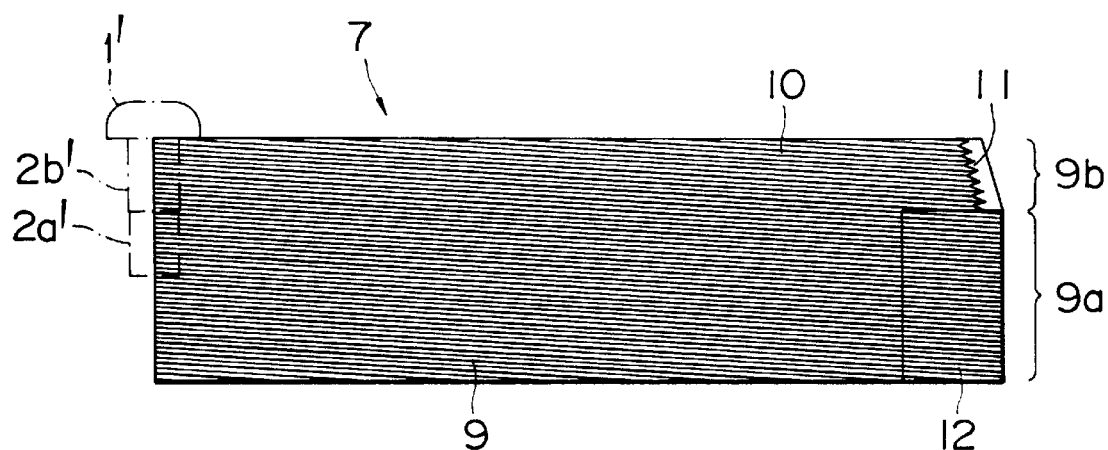
FIG. 10 is a front elevation view of another embodiment of the fixed die according to the method of the present invention.
Figure 11:
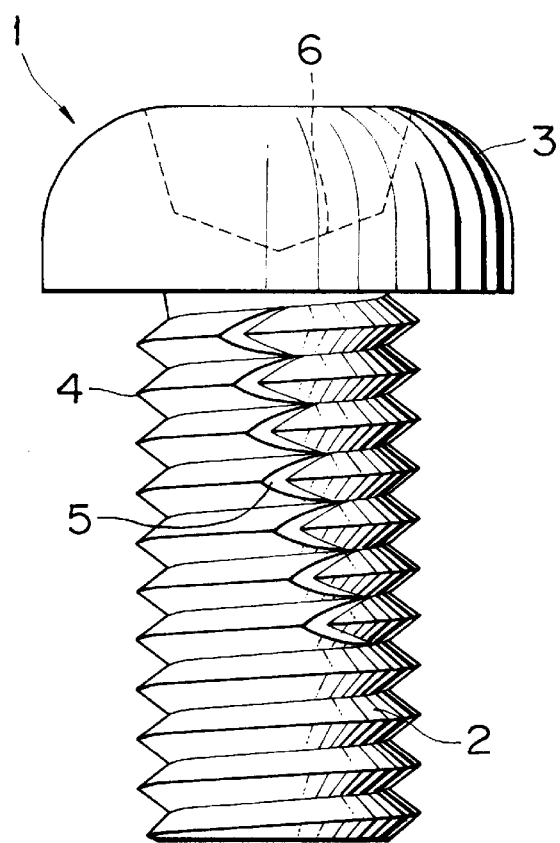
FIG. 11 is a front elevation view of another embodiment of the male screw of the present invention that is manufactured using the fixed die of FIG. 10.

FIG. 10 shows another embodiment of the fixed die according to the present invention. In this embodiment the slope 11 extends in a direction slanted from the direction perpendicular to the moving direction of the blank 1'. When the slope 11 extends perpendicular to the moving direction of the blank 1' as in FIG. 6, the protrusions 5 are arranged on the shaft 2 in the direction parallel to the axial direction of the shaft 2 as shown in FIG. 1. When the slope 11 extends in the slanted direction as in FIG. 10, the protrusions 5 are arranged on the shaft 2 in spiral as shown in FIG. 11.

Figure 12:
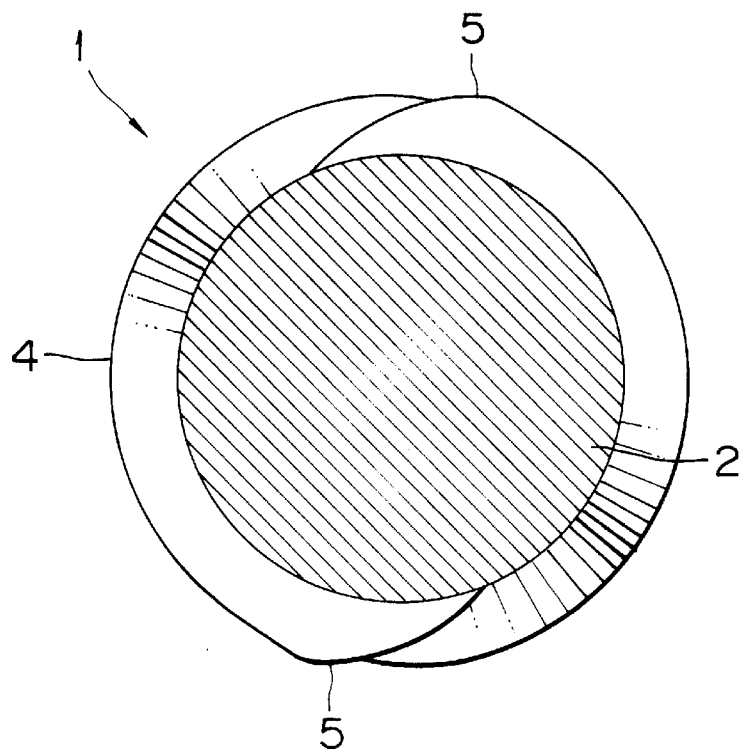
FIG. 12 is an enlarged cross sectional view of still another embodiment of the male screw of the present invention.

In the embodiment of a method for manufacturing the male screw 1 of FIGS. 1 through 3 which is shown in FIGS. 4 through 9, because the slope 11 is formed only on the fixed die 7 but not on the moving die 8, one protrusion 5 is formed on the thread 4 for every pitch of the thread 4. However, if a slope similar to the slope 11 is formed also on the moving die 8, two protrusions 5 will be formed on the thread 4 for every pitch thereof as shown in FIG. 12. However, when the slope extends in a direction slanted from the direction perpendicular to the moving direction of the blank 1' as in FIG. 10 or the screw 1 is a multiple-start thread screw, numbers of the protrusion 5 per pitch of the thread 4 will vary from the aforementioned number.

Figure 13:
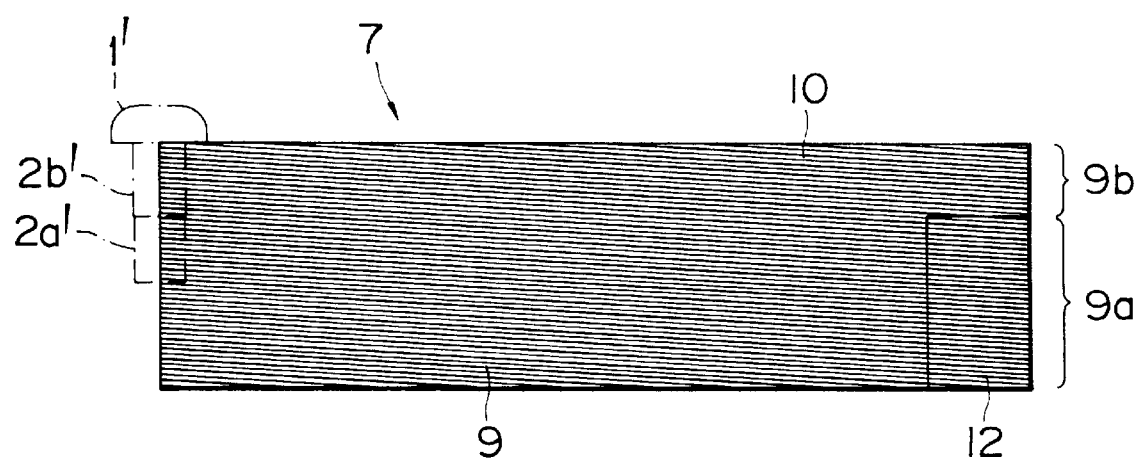
FIG. 13 is a front elevation view of still another embodiment of the fixed die according to the method of the present invention.
Figure 14:
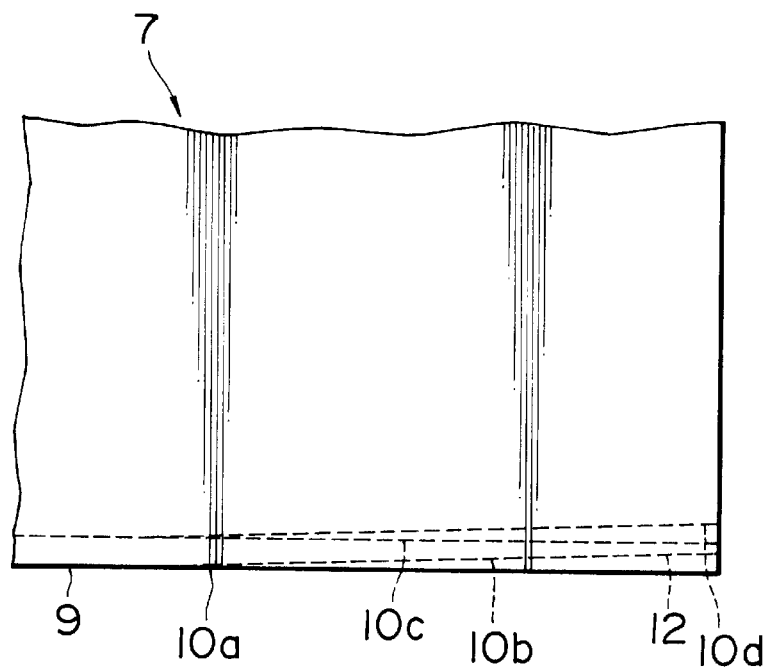
FIG. 14 is an enlarged plan view of the fixed die of FIG. 13.
Figure 15:
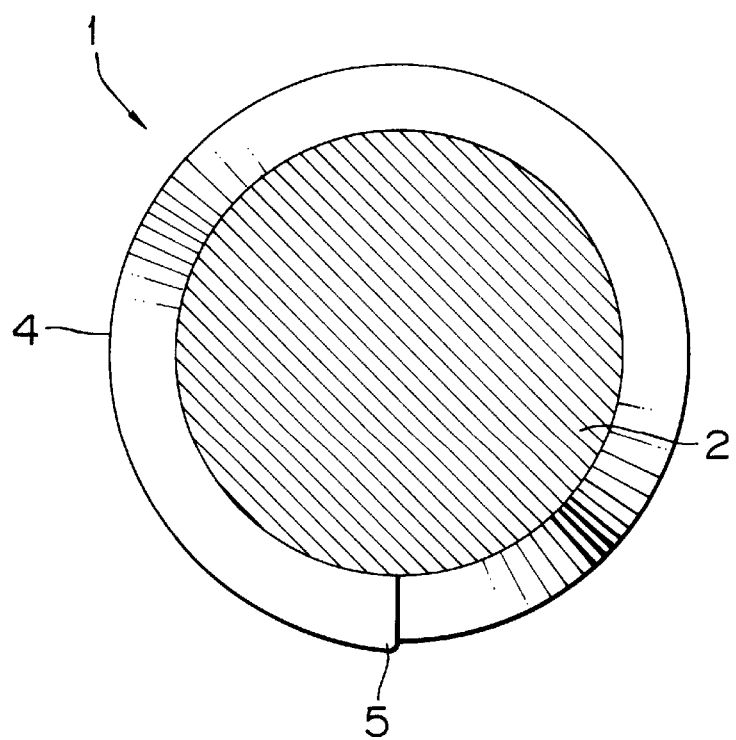
FIG. 15 is, similar to FIG. 2, an enlarged sectional view of a further embodiment of the male screw of the present invention that is manufactured using the fixed die of FIGS. 13 and 14.

FIGS. 13 and 14 show still another embodiment of the fixed die according to the method of the present invention. In this embodiment neither the slope 11 nor a run off is formed at the rearward end of the area 9b of the die face 9. Performing thread rolling with such fixed die 7 provides a male screw 11 with protrusions 5 which rise from the thread 4 in the radial direction of the shaft 2 as shown in FIG. 15. Even with such configuration of the protrusions 15, the loosening of the screw 1 can also be prevented. However, in this case, when the male screw 1 is turned deliberately in the direction to loosen it, the protrusions 5 may destroy an object to be screwed in (in the event that the male screw 1 is used as a self tapping screw) or a female thread. On the other hand, in the event that the rearward end of the area 9b of the die face 9 is provided with the slope 11 as in the aforementioned embodiments, the protrusions 5 are formed to rise from the thread 4 with an inclination from the radial direction of the shaft 2 of the male screw 1 as shown in FIG. 2 and the possibility that the protrusions 5 may destroy an object to be screwed in or a female thread will be decreased when the male screw 1 is turned deliberately in the loosening direction.

Figure 16:
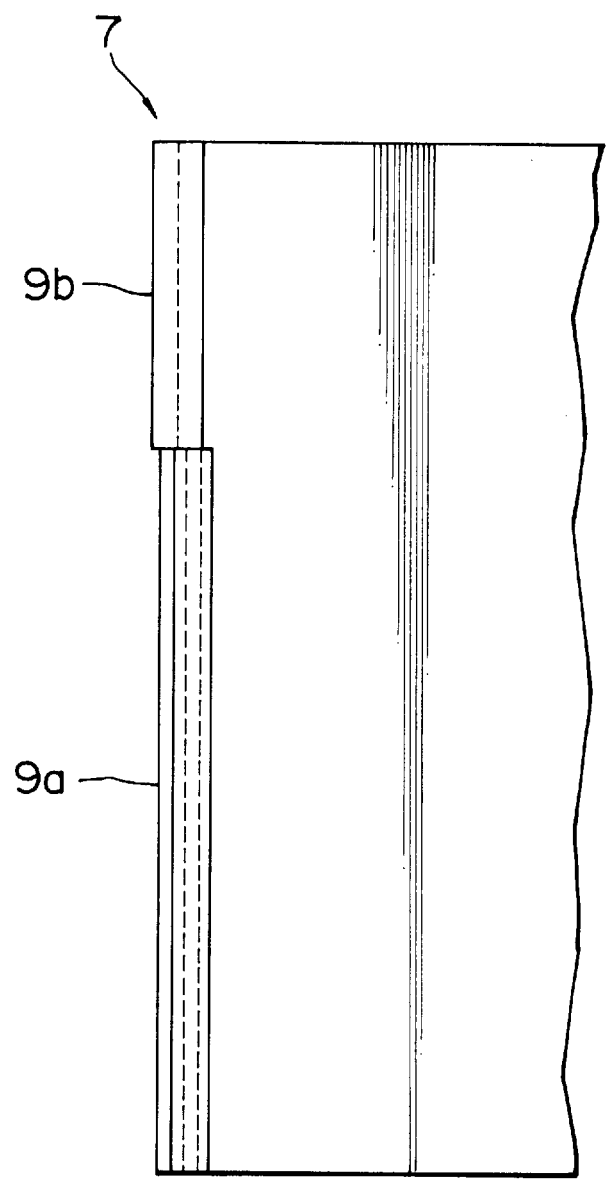
FIG. 16 is a side elevation view of a further embodiment of the fixed die according to the method of the present invention.

FIG. 16 shows a side elevation view of a further embodiment of the fixed die according to the method of the present invention. In this embodiment, unlike the blank 1' of FIG. 4, the blank 1' is not stepped and has a uniform diameter over all the length thereof, while the area 9b in the die face 9 of the fixed die 7 is protruded as compared with the area 9a so as to increase the rolling pressure on the area 9b as compared with an ordinary rolling pressure. With this arrangement, the screw with the protrusions of the present invention also can be obtained in the same way as above embodiments.

While, in the above embodiments, the profile or cross section of the thread 4 is triangular one, it should be understood that the thread of the male screw in the present invention may be of another type of profile or cross section.

While, in the above embodiments, the present invention is applied to a self tapping screw or a machine screw, it should be understood that the present invention can be applied to other kinds of male screws such as a bolt, set screw, wood screw, cap screw or the like.

While, in the above embodiments, the male screw 1 is provided with the head 3, it should be understood that the male screw of the present invention may be one without a head.

While, in the above embodiments, the protrusions 5 protrude from the thread 4 in both the normal direction to the flanks of the thread 4 and the radial direction of the shaft 2, it should be understood that in the present invention it is possible for the protrusion not to protrude with regard to the radial direction of the shaft of the male screw.

While, in the above embodiments, flat dies are used, it should be understood that in the present invention other kinds of dies such as round dies or the like may be used. However, in the event that round dies are used, it is required to determine a rearward end in a die face of at least one of the dies and to always complete the rolling process for every blank at the rearward end.

Although preferred embodiments of the present invention have been shown and described herein, it should be apparent that the present disclosure is made by way of example only and that variations thereto are possible within the scope of the disclosure without departing from the subject matter coming within the scope of the following claims and a reasonable equivalency thereof.

What is claimed is:

1. A male screw comprising a protrusion protruding from an appropriate part of a thread thereof, said protrusion includes two portions, each portion formed on an opposing side of a crest of said thread and extending at an acute angle relative to a line formed by said crest in a circumferential direction on a flank of said thread to form an abrupt angled ridge, each portion becoming tapered at a root of said screw and being asymmetrical relative to a respective flank surface including the tapered portion, each portion includes a V-shaped first edge region extending from a respective tapered portion on a respective root to a respective crest along a respective flank, each portion includes a V-shaped second edge region extending from a respective tapered portion at which a corresponding V-shaped first edge region extends therefrom, each V-shaped second edge region increasing in height with respect to a corresponding V-shaped first edge region and reaching a maximum height at a respective crest, said first and second V-shaped edge regions forming a double V-shape, said double V-shape includes an apex which substantially corresponds and covers a respective crest of said screw, said apex is substantially triangular, said protrusion protrudes from said thread in both a normal direction to said flank and the radial direction of a shaft portion of said male screw, said protrusion forms an abrupt angled ridge surface discontinuity on said crest and respective flanks, said protrusion prevents loosening of said screw while increasing manufacturing efficiency thereof.

2. The male screw as set forth in claim 1, where in, adjacent to a forward end of the shaft of said male screw, said thread is not provided with said protrusion.

3. The male screw as set forth in claim 1, wherein said protrusion is raised from said thread with an inclination from the radial direction of the shaft of said male screw.

4. The male screw as set forth in claim 1, wherein said screw has a plurality of protrusions aligned in a direction parallel to a longitudinal axis of said screw.

5. The male screw as set forth in claim 1, wherein said screw has a plurality of protrusions aligned in a spiral pattern relative to a longitudinal axis of said screw.

6. The male screw as set forth in claim 1, further comprising a head, said head including at least one of a slot and socket.

* * * * *